3,347,920
PURIFICATION OF CYCLOHEXYLAMINE
Wayne E. Trussell, Gurnee, and Vipin D. Shah, Waukegan, Ill., assignors to Abbott Laboratories, Chicago, Ill., a corporation of Illinois
No Drawing. Filed June 1, 1964, Ser. No. 371,793
6 Claims. (Cl. 260—563)

The present invention is concerned with the removal of sulfate from cyclohexylammonium-N-cyclohexylsulfamate (hereinafter referred to as "double salt"). More particularly, the invention is concerned with the removal of cyclohexylamine sulfate from a mixture containing "double salt", cyclohexylamine sulfate and free cyclohexylamine.

"Double salt" is an important intermediate in the production of cyclohexylsulfamic acid and salts thereof which are used as artificial sweeteners. There are various ways known and used to make this "'double salt" and all economical methods for the production of the aforesaid artificial sweetener use this "double salt" as the stepping stone for the preparation of sodium or calcium cyclohexylsulfamate. The commercial productions generally start with cyclohexylamine as the most important primary reactant and use as the secondary reactant a sulfonating agent such as ammonium sulfamate, sulfamic acid, or sulfur trioxide. Depending on the choice of the secondary reactant, different by-products are obtained in this reaction: they differ from one another in their composition and/or in chemical structure.

One of the most prominent by-products in the reaction between cyclohexylamine and a sulfonating agent is cyclohexylamine sulfate. This sulfate is very difficult to remove, primarily because it has solubility characteristics very closely resembling those of the "double salt." Unfortunately, on hydrolyzing the "double salt" to the corresponding sodium cyclohexylsulfamate, cyclohexylamine sulfate forms the corresponding sodium sulfate which is equally difficult to remove from the desired sodium cyclohexylsulfamate.

It has been known for some time that a small amount of cyclohexylamine sulfate mixed in with the "double salt" can be removed by a simple washing operation with water at room temperature or below. However, an economical washing operation removes only up to about 3 grams of cyclohexylamine sulfate per 100 grams of solids, since when larger amounts of water are used, considerable losses of "double salt" occur. It is therefore economically unfeasible to remove larger amounts of cyclohexylamine sulfate than about 3% from precipitated "double salt" by a washing operation.

Unfortunately, when sulfur trioxide is used as the sulfonating agent in the process of making "double salt," considerably more than 3% of cyclohexylamine sulfate may form. Actually, the amount of the latter may be between 5% and 20% of the "double salt" and thus, in view of the foregoing, a simple wash with water would not be possible for removal of the cyclohexylamine sulfate.

It is thus an object of the present invention to remove substantially all cyclohexylamine sulfate from a mixture of "double salt," cyclohexylamine sulfate and cyclohexylamine. It is a particular object of the present invention to remove cyclohexylamine sulfate from the reaction mixture obtained when cyclohexylamine is reacted with sulfur trioxide.

These and other objects are accomplished by slurrying a composition containing 4–30 parts by weight of cyclohexylamine sulfate, 50–90 parts by weight of "double salt," and 5–40 parts by weight of free cyclohexylamine with $y$ parts of water and removing the liquid phase from the solid phase, said $y$ being calculated by multiplying the total parts of solids (cyclohexylamine sulfate plus "double salt") in the initial composition by $z$, whereby $z$ is selected to be between $15/x$ and $25/x$ with $x$ being the percentage of free cyclohexylamine in the initial composition.

Expressed in a different way, a mixture of A parts of cyclohexylamine sulfate, B parts of "double salt," and C parts of cyclohexylamine requires $z(A+B)$ parts of water with $$\frac{0.15(A+B+C)}{C} < z < \frac{0.25(A+B+C)}{C}$$

to produce the desired separation of cyclohexylamine sulfate from "double salt": substantially all of the cyclohexylamine sulfate is eliminated with the liquid phase. As a rule of thumb, a mixture containing 15% cyclohexylamine requires 1–1.5 grams of water per gram of solids from the reslurry operation; a mixture containing 20% cyclohexylamine requires about 1 gram of water per gram of combined solids, and a mixture with 25% cyclohexylamine requires 0.6–1.0 grams of water per gram of combined solids for good separation results. Obviously, the separation of the solid from the liquid can be done in various ways, e.g. by centrifugation or filtration. The remaining mother liquor in the solid can then be displaced by water, using a small amount of the latter for a brief wash.

Although cyclohexylamine is a liquid at room temperature, a composition such as that defined above and containing cyclohexylamine sulfate and "double salt" is a solid mass at room temperature in spite of containing between about 5% and about 40% of cyclohexylamine. Such a composition is ordinarily obtained in the process of sulfonating cyclohexylamine with sulfamic acid, ammonium sulfamate or sulfur trioxide. Usually in such a reaction, cyclohexylamine is the only liquid present and serves not only as reactant but also as the reaction medium and is thus used in considerable excess. After completion of the reaction and removal of the liquid phase by evaporation, the solid mass still contains between about 5% and 40% of free cyclohexylamine, and depending on the amount of cyclohexylamine in such a solid mass, the amount of water which which most effectively removes the intolerable amount of cyclohexylamine sulfate obtained with the "double salt" can be calculated. Best results with the present process are obtained with compositions containing at least 10% free cyclohexylamine. If less than this amount is present, it is advisable to add additional cyclohexylamine to the initial composition or to the reslurry water.

In a general embodiment of the process of the present invention, "double salt" admixed with about 0.05–0.3 part of cyclohexylamine sulfate per part of "double salt" and containing between 5% and 40% free cyclohexylamine per total amount of solids is agitated in water of room temperature, the amount of water being calculated to represent an amount determined by the limits $15/x$ and $25/x$, $x$ being the amount of cyclohexylamine in percentage of total amount of initial mixture. After 15 minutes of agitation, the slurry is filtered or centrifuged to separate the solids from the liquids and, if desired, the solids are washed with 0.1–0.4 part of water per part of solid. If the wash is carried out directly on the filter, up to 0.8 parts of water per part of solids may be used in order to obtain an exceptionally pure product but at a somewhat lower initial yield. Instead of water, a water/cyclohexylamine mixture similar to the above may be used advantageously for the wash operation.

It has been found that by operating in the above manner, the reslurrying operation removes effectively about 70% of the cyclohexylamine sulfate present in the initial reaction mixture and only relatively small losses of "double salt" are encountered. When, for example, a reaction mixture obtained in the manner described above contains only about 10% of cyclohexylamine sulfate as measured in the total amount of solids present, the resulting filter cake retains only about 3% cyclohexylamine sulfate and this latter amount can easily be removed by a simple wash on the filter.

It will be readily appreciated by those skilled in the art that the reslurrying procedure as well as the washing procedure which may follow, also remove a small percentage of the desired "double salt." However, these losses are easily recoverable by hydrolyzing the combined reslurry liquors and wash liquors with calcium hydroxide whereby calcium sulfate precipitates and calcium cyclohexylsulfamate remains in solution. Filtration and evaporation of the filtrate will then produce almost pure calcium cyclohexylsulfamate so that virtually no losses are encountered with the new sulfate removal process.

To better understand the process of the present invention, reference is made to the following examples which are given here as illustrations only and are not meant to limit the invention in any respect.

EXAMPLE 1

(a) A solid mass of 135 grams of "double salt," 15 grams of cyclohexylamine sulfate (total amount of solids=150 grams), and 37.5 grams of cyclohexylamine (20% by weight; $x=20$) is slurried with 113 grams of water (0.75 ml. of water per gram of combined solids). After 15 minutes of agitation, the slurry is filtered and the filtrate and filter cake are analyzed as to the content of sulfate and "double salt." The filter cake is found to contain 129.9 grams containing 93.8% of the initially present "double salt," and the filtrate is found to contain 65.3% of the initially present cyclohexylamine sulfate.

(b) When in this example, 185 ml. of water are used, the filter cake is slightly lighter in weight but contains a higher percentage of "double salt" while the filtrate contains over 70% of the initially present sulfate and slightly more "double salt."

(c) When in a control run to the process under (a), the specified amount of water is used without reslurrying, i.e. by using it only as a wash liquor for the solids initially placed on a Buchner funnel, the dried filter cake then analyzes 12.0 grams of cyclohexylamine sulfate and 122.0 grams of "double salt." The wash liquor contains 0.9 gram of cyclohexylamine sulfate and 8.2 grams of "double salt."

EXAMPLE 2

A mixture containing 31.5 pounds of solids assaying 58% "double salt," 22% cyclohexylamine sulfate and 20% cyclohexylamine is reslurried in 25 pounds of water, centrifuged, and washed with 20 pounds of water. The resulting dried solids represent 86% of the initially present "double salt" and only 3.7% of the initially present cyclohexylamine sulfate, or, the final composition contains 98.6% "double salt" and 1.4% cyclohexylamine sulfate.

If, in this example, the wash is omitted, the centrifuged solids contain 16.9 pounds of "double salt" and 2.6 pounds of cyclohexylamine sulfate, which represents a purity of 87%, whereas the initial dry mixture contains 27.5% of the cyclohexylamine sulfate.

By using, as a wash liquor in the above example, a mixture of water and cyclohexylamine 80/20, a final analysis shows the "double salt" in a purity of 99.2%.

EXAMPLE 3

68 pounds of a reaction product assaying 65% "double salt," 20% cyclohexylamine sulfate and 15% cyclohexylamine, is charged into a 25-gallon vessel. This mixture is agitated with 58 pounds of water (1.0 pound per pound of dry solids) while cooling for 30 minutes, the temperature being reduced to 20° C. The resulting slurry is centrifuged and washed with 11.6 pounds of water. The dry solids represent 57.2 pounds (or 88%) of the initially present "double salt" and the assay shows that only a trace of cyclohexylamine sulfate is present; thus, essentially all of the cyclohexylamine sulfate which made up 23.5% of the initial dry mixture, is removed by this technique.

EXAMPLE 4

"Double salt" can be recovered from the liquors obtained from the "double salt" reslurry technique for sulfate removal. Liquors from a typical example such as Example 2 above contain 2.6 pounds of "double salt" and 6.7 pounds of cyclohexylamine sulfate, the liquid phase of the solution being cyclohexylamine and water. To this solution, 2.1 pounds of calcium hydroxide is added. From the resulting slurry, all cyclohexylamine is removed by distillation during which time the "double salt" hydrolyzes. The remaining aqueous slurry contains calcium cyclohexylsulfamate and calcium sulfate. The calcium cyclohexylsulfamate is isolated by filtering off the calcium sulfate and purified by well-known techniques; it is obtained in nearly theoretical yield.

In the above and similar examples it was found consistently that the process of the present invention always effectively removes substantially all of the cyclohexylamine sulfate admixed with "double salt," with the losses of "double salt" being kept at a minimum. Actually, the term "loss" is not applicable because, as mentioned above, the desired final material using "double salt" as the intermediate can still be recovered from the filtrate as a useful product (calcium cyclohexylsulfamate).

When, on the other hand, other separation techniques are used, much greater losses of "double salt" occur without as effective a removal of cyclohexylamine sulfate as by the present process. For instance, when in the case of an initial content of 25% cyclohexylamine, 0.5 part of water are used for the reslurrying operation per part of combined solids in the reaction mixture, only 41.8% sulfate it removed (60 parts of water is the calculated minimum according to the present invention), and when in the case of 15% cyclohexylamine content, 0.4 part of water are used per gram of combined dry solids, only 44% of the sulfate present is removed (permitted minimum amount of water according to the invention is 1.0 part per part of dry solids). When the amount of water used in the reslurrying or washing operation is too large, 80% or even 90% of the sulfate can be removed but more "double salt" has to be recovered from the liquid phase.

The process of the present invention is best carried out with water of room temperature. However, in certain instances it may appear more advantageous to use a somewhat higher temperature for the slurrying operation; in those instances, filtration should be carried out at or in the vicinity of room temperature to keep the direct losses of "double salt" at a minimum, even though these losses can be recovered at added expense from the filtrate thereafter as indicated. The fact that the reslurrying can be carried out at elevated temperatures is particularly advantageous when the mixture to be separated comes straight from the manufacturing area where the last step in preparing the "double salt" is the evaporation of excess cyclohexylamine.

Others may practice the invention in any of the numerous ways which will be obvious to those skilled in the art by the present disclosure. All such practice of the invention is considered a part hereof provided it falls within the scope of the appended claims.

We claim:

1. The process of removing cyclohexylamine sulfate from a solid composition containing cyclohexylamine sulfate, cyclohexylammonium-N-cyclohexylsulfamate, and cyclohexylamine, comprising slurrying said mixture in $y$ parts of water and removing the liquid phase from the solid phase, said $y$ being calculated according to the equation $y=(A+B)z$ wherein $z$ is selected between $15/x$ and $25/x$ with $x$ representing the percentage of cyclohexylamine in the initial composition, and wherein $A+B$ represents the combined amounts of cyclohexylamine sulfate and cyclohexylammonium-N-cyclohexylsulfamate.

2. The process of claim 1 wherein said solid composition is slurried in water of room temperature for a period of at least 15 minutes.

3. The process of claim 1 wherein the liquid phase is removed from the solid phase by filtration.

4. The process of claim 1 wherein said liquid phase is removed from said solid phase by centrifugation.

5. The process of claim 1 wherein said solid composition contains 4-30 parts by weight of cyclohexylamine sulfate, 50-90 parts by weight of cyclohexylammonium-N-cyclohexylsulfamate, and 5-40 parts by weight of cyclohexylamine.

6. The process of claim 5 wherein said solid mixture contains at least 10% by weight of free cyclohexylamine.

No references cited.

CHARLES B. PARKER, *Primary Examiner.*

P. C. IVES, *Assistant Examiner.*